(12) United States Patent
Paffrath

(10) Patent No.: US 8,047,502 B2
(45) Date of Patent: Nov. 1, 2011

(54) COMBINED CHECK AND CONTROL VALVE

(75) Inventor: Holger Paffrath, Pulheim (DE)

(73) Assignee: Pierburg GmbH, Neuss (DE)

( * ) Notice: Subject to any disclaimer, the term of this patent is extended or adjusted under 35 U.S.C. 154(b) by 490 days.

(21) Appl. No.: 12/171,143

(22) Filed: Jul. 10, 2008

(65) Prior Publication Data
US 2009/0020724 A1    Jan. 22, 2009

(30) Foreign Application Priority Data

Jul. 10, 2007    (DE) .......................... 10 2007 031 957

(51) Int. Cl.
*F16K 31/00*    (2006.01)
(52) U.S. Cl. ............................. 251/63.4; 251/61; 251/83
(58) Field of Classification Search .................... 251/61, 251/61.2, 63.4, 82, 83
See application file for complete search history.

(56) References Cited

U.S. PATENT DOCUMENTS

| 4,836,241 | A | * | 6/1989 | Schoenwald | ................. 137/494 |
| 5,203,872 | A | * | 4/1993 | Naffziger | ........................ 251/82 |
| 5,284,180 | A | * | 2/1994 | Guo et al. | ..................... 137/488 |
| 5,984,263 | A | * | 11/1999 | Hosoya | ..................... 251/129.15 |
| 6,752,171 | B1 | * | 6/2004 | Kemmler et al. | ............. 137/552 |

FOREIGN PATENT DOCUMENTS

| DE | 9415251.9 U1 | 9/1994 |
| DE | 102007031957.8 | 3/2008 |
| DE | 4025267 A1 | 10/2008 |
| JP | 55049519 A | 4/1980 |
| JP | 2196121 A | 8/1990 |

* cited by examiner

*Primary Examiner* — John Fristoe, Jr.
(74) *Attorney, Agent, or Firm* — Griffin & Szipl, P.C.

(57) ABSTRACT

To overcome problems concerning the sticking of the check plate in a combined check and control valve, a stop is provided on the valve rod or a guide element in the vicinity of the valve rod, whose distance to the limiting element is smaller than the maximum stroke and larger than the nominal stroke of the limiting element. Thus, it is achieved that the check plate is released from the valve seat by means of the stop, when the valve rod is displaced to the maximum.

19 Claims, 3 Drawing Sheets

COMBINED CHECK AND CONTROL VALVE

This application claims priority on German application DE 102007031957.8, filed Jul. 10, 2007, the entire disclosure of which is hereby incorporated by reference.

FIELD OF THE INVENTION

The invention refers to a combination of a check valve and a control valve, especially a secondary air valve for an internal combustion engine, comprising a housing provided with an inlet and an outlet formed therein, one or a plurality of passages that are provided between the inlet and the outlet, which are each surrounded by a valve seat and closable by means of a check plate, wherein the latter check plate is biased against the one or the plurality of valve seats by a spring element supported, on its axially opposite side, on a limiting element which is, at least indirectly, fixedly connected to a valve rod operated through an actuator, wherein the valve rod is connected, at least indirectly, to a stop arranged at a constant distance from the limiting element.

Such combined check and control valves are used, in particular, for a metered introduction of secondary air into the exhaust gas path of an internal combustion engine. Here, the limiting element to be operated by means of the actuator serves to control a volume of secondary air supplied, whereas the spring-loaded check plate of such a valve serves to prevent a return flow into the secondary air supply region caused by exhaust gas pulses.

Especially in the warm-up phase of an internal combustion engine, during which a richer mixture is used, the supply of secondary air into the exhaust gas systems serves to reduce pollutants, notably CO and HC parts, by afterburning. Moreover, the operating temperature of a downstream catalytic converter is reached faster.

BACKGROUND OF THE INVENTION

DE 40 25 267 A1 describes a check valve for a gas line, wherein a check plate is biased against a valve seat by a plate spring element. A limiting element adjustable, by means of an actuator, abuts the check plate in the closed state of the valve with interposition of the spring, while, in the open state, this limiting element abuts a fixedly installed maximum stroke limit. This limiting element is displaceable between these two maximum positions. With such valves, the problem arises that the check plate tends to stick to the valve seat either due to excessive soot deposits or due to freezing.

DE 94 15 251 U1 proposes a check valve for a gas line, wherein the stroke limiting element is provided with one or more recesses in which individual helical springs are arranged that bias the check plate against a valve seat. In addition, the limiting element has an axial collar in the outer circumferential portion, which in the closed state of the valve also abuts a valve seat. In order to avoid a sticking of the check plate or the limiting element to the valve seats, these are provided with a PTFE layer intended to prevent baking. Further, this valve comprises a guide element on which the check plate slides and which is fixedly secured to the valve rod. This guide element has a collar at the end facing towards the actuator, wherein the check plate abuts this collar only upon assembly.

Forming the valve seats from PTFE, or with a PTFE coating, represents an additional manufacturing step and, thus, entails additional costs. Moreover, in long-term operation of the valve, coking or frozen water can settle in the area next to the valve and may grow beyond the same with time, which may also lead to a sticking of the check plate to the valve seat.

Therefore, it is the object of the present invention to provide a combined check and control valve, wherein an adhering check plate can be reliably released, while additional costs or additional manufacturing steps are to be avoided as far as possible.

SUMMARY OF THE INVENTION

This object is achieved with the characterising part of a first embodiment. Accordingly, with a sticking check plate, opening the valve beyond the nominal stroke up to a maximum stroke causes the stop to be pressed against the check plate by the force of the actuator, whereby the same can come clear of the valve seat. At the same time, the nominal stroke is not influenced by the stop, so that the usual function of the check plate is maintained. The nominal stroke should be large enough for the further stroke movement towards the maximum stroke to have but little influence on the volume flow to be conveyed.

In a further embodiment of the invention, a guide element is arranged on the valve rod, on which element the check plate slides. Such a guide element prevents a sticking of the check plate to the valve rod and thus prevents an unintentional opening of the check plate if exhaust gas counter pressure prevails when the limiting element is open.

In a further embodiment, the stop is in the form of a collar at the guide element, so that no additional components are needed and the valve can still be manufactured economically. Preferably, the limiting element abuts the check plate when the check and control valve is in the closed state, whereby unintentional opening is reliably avoided, without requiring a second valve seat for the limiting element.

According to an alternative embodiment of the present invention, in the closed state of the check and control valve, an axial collar at the outer circumference of the limiting element abuts a second valve seat that surrounds the first valve seat or the first valve seats. This, too, reliably prevents an accidental opening in the closed state.

In a preferred embodiment, the actuator is a solenoid, so that intermediate positions of the limiting element can also be approached by means of a corresponding electronic control. In a further development of this aspect of the invention, for the actuation of the valve rod, the solenoid may be driven with a voltage below the maximum voltage, so that, for releasing the check plate and for displacing the limiting element to the maximum stroke position, the maximum voltage prevails on the solenoid and the metering positions are approached by driving the solenoid with a lower voltage, where, in particular, the nominal stroke position is approached by driving the solenoid with normal voltage. Thus, a simple displacement between the two positions of the limiting element is obtained.

In an alternative embodiment thereof, the actuator is a pneumatically operated actuator, which may be achieved by means of an upstream electric switch-over valve connected to a vacuum source. Such embodiments can be manufactured economically. Moreover, a pressure controller can be connected upstream, so that again various defined positions could be approached.

In a further embodiment of the invention, the check and control valve comprises a position control, whereby intermediate positions can also be approached and, in particular, the maximum stroke and the nominal stroke can be differentiated. Even if the marginal conditions change, the position control allows for a reliable approach to the desired position of the limiting element. To this end, the position control advantageously comprises a magnet coupled with the valve rod and is operatively connected with a contactless magneto-resistive sensor fixedly arranged in the housing. Such position control units are practically not subject to any wear and, thus, have a long useful life.

Preferably, the at least one spring element is a helical spring radially surrounding the valve rod so that a uniform load on both the limiting element and the check plate results therefrom. A tilting of the two components with respect to each other and a resulting leakiness of the check plate are largely avoided. In an alternative embodiment, at least three spring elements are provided in pockets 18 of the limiting element that are supported on the check plate. This also prevents a tilting of the check plate towards the limiting element and thus an accidental opening of the passages.

A combined check and control valve of such design is insensitive to the accretion of ice or soot, since the release of the check plate is ensured by the force of the actuator acting on the check plate when the valve rod is displaced beyond the nominal stroke. Such a valve can be manufactured economically and has a long service life. Failures in operation are largely excluded by this structure.

Thus, in accordance with a first embodiment of the present invention, a combined check and control valve, especially a secondary air valve for an internal combustion engine, is provided, wherein the combined check and control valve includes: (a) a housing, in which an inlet and an outlet are formed, (b) one or a plurality of passages that are arranged between the inlet and the outlet, wherein each one of the passages is surrounded by a respective valve seat and is closable by means of a check plate that is biased against the one or the plurality of valve seats by means of at least one spring element supported, on its axially opposite side, and on a limiting element which is at least indirectly fixedly secured to a valve rod operable by means of an actuator, wherein the valve rod is at least indirectly connected with a stop situated at a constant distance from the limiting element, characterized in that the stop (23) is positioned on the valve rod such that the stop (23) presses against the check plate (8) when the limiting element (17) is opened beyond the nominal stroke (25). In accordance with a second embodiment of the present invention, the first embodiment is modified so that a guide element is arranged on the valve rod (9), on which guide element the check plate (8) slides. In accordance with a third embodiment of the invention, the first embodiment and the second embodiment are further modified so that the stop (23) is formed as a collar on the guide element.

In accordance with a fourth embodiment of the invention, the first embodiment, the second embodiment and the third embodiment are further modified so that the limiting element (17) abuts on the check plate (8) in the closed state of the check and control valve. In accordance with a fifth embodiment of the present invention, the first embodiment, the second embodiment, the third embodiment and the fourth embodiment are further modified so that, in the closed state of the check and control valve, the limiting element has an axial collar (21) on the outer circumference of the limiting element (17) abutting on a second valve seat (22) surrounding the first valve seat (7).

In accordance with a sixth embodiment of the present invention, the first embodiment, the second embodiment, the third embodiment, the fourth embodiment and the fifth embodiment are further modified so that the actuator (10) is a solenoid. In accordance with a seventh embodiment of the present invention, the sixth embodiment is further modified so that the solenoid is adapted to be driven with a voltage below the maximum voltage.

In accordance with an eighth embodiment of the present invention, the first embodiment, the second embodiment, the third embodiment and the fourth embodiment, and the fifth embodiment are further modified so that the actuator is a pneumatically operated actuator. In accordance with a ninth embodiment of the present invention, the first embodiment, the second embodiment, the third embodiment, the fourth embodiment, the fifth embodiment, the sixth embodiment, the seventh embodiment, and the eighth embodiment are further modified so that the check and control valve comprises a position control. In accordance with a tenth embodiment of the present invention, the first embodiment, the second embodiment, the third embodiment, the fourth embodiment, the fifth embodiment, the sixth embodiment, the seventh embodiment, the eighth embodiment, and the ninth embodiment are further modified so that the position control includes a magnet coupled with the valve rod (9) and is operatively connected with a contactless magneto-resistive sensor fixedly secured in the housing (1). In accordance with an eleventh embodiment of the present invention, the first embodiment, the second embodiment, the third embodiment, the fourth embodiment, the fifth embodiment, the sixth embodiment, the seventh embodiment, the eighth embodiment, the ninth embodiment and the tenth embodiment are further modified so that the at least one spring element (20) is a helical spring radially surrounding the valve rod (9). In accordance with a twelfth embodiment of the present invention, the first embodiment, the second embodiment, the third embodiment, the fourth embodiment, the fifth embodiment, the sixth embodiment, the seventh embodiment, the eighth embodiment, the ninth embodiment and the tenth embodiment are further modified so that at least three spring elements are arranged in pockets (18) in the limiting element, which springs bear on the check plate.

One or more non-limiting, illustrative embodiments of the invention are illustrated in the drawings and will be described hereinafter.

BRIEF DESCRIPTION OF THE DRAWING(S)

DETAILED DESCRIPTION OF THE INVENTION

Figure 1:
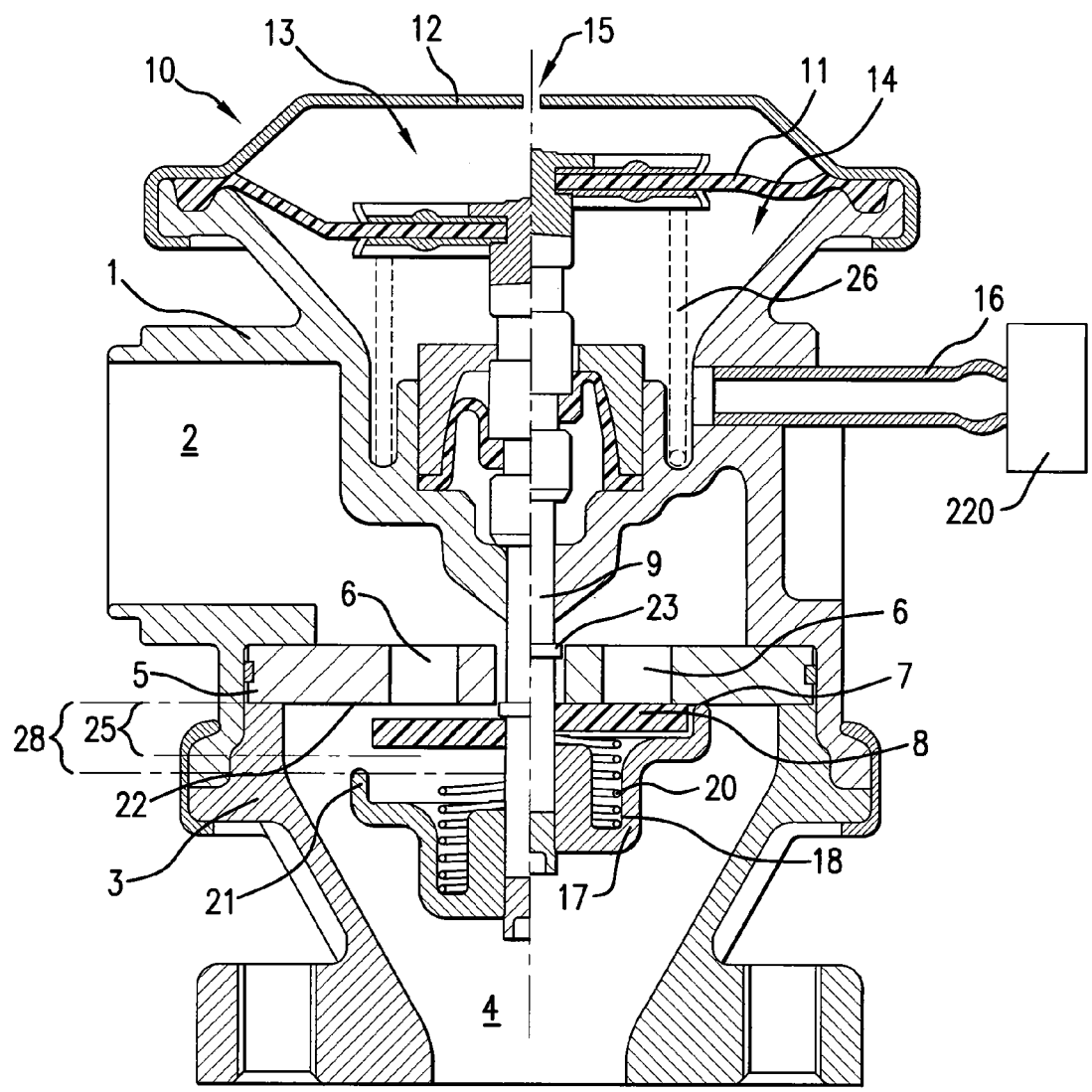
FIG. 1 shows an embodiment of a combined check and control valve of the present invention in side elevational view, wherein the left half of the FIG. 1 is showing the valve at the maximum stroke position and the right half is showing the valve in the closed position.

The combined check and control valve illustrated in FIG. 1 is substantially formed by a bipartite housing, wherein an inlet 2 is formed in the first housing part 1 and an outlet 4 is formed in the second housing part 3. A plate 5 is arranged between the two housing parts 1, 3, and, thus between the inlet 2 and the outlet 4, the plate comprising several passages 6, each surrounded by first valve seats 7, is disposed. The passages 6 are controlled by a check plate 8 so that, depending on the position of the check plate 8, either an air flow is allowed to flow from the inlet 2 to the outlet 4 or the flow path is blocked by the check plate 8 being seated on the valve seats 7.

The check plate 8 is slidably arranged on a valve rod 9 that may be operated via a pneumatic actuator 10. Accordingly, a first end of the valve rod 9 is fixedly connected to a membrane 11 that is part of the pneumatic actuator 10 and whose outer circumference is clamped, by a cover element 12, between the first housing part 1 and the cover element 12 so that the membrane 11 divides a space between the first housing part 1 and the cover element 12 into two spaces 13, 14. Due to a hole 15 (or hole 215) in the cover element 12, atmospheric pressure prevails in the space 13, whereas in the space 14 therebelow a pilot pressure prevails that is fed into the space 14 via a line 16. The line 16 is connected with any type of vacuum source 220 so that, depending on the pressure prevailing in the line 16 and thus in the space 14, the valve rod 9 can be switched from a rest state to a state in which the valve is opened.

At the opposite, second end of the valve rod 9, a limiting element 17 is fastened, which thus moves along with the valve rod 9 when the actuator 10 is operated. This limiting element 17 has a recess 18 formed concentric with the valve rod 9 and accommodating a spring element 20 in the form of a helical spring whose first axial end abuts against the limiting element 17 and whose opposite axial end abuts against the check plate 8. This limiting element 17 is thus displaceable, via the valve rod 9, between a closed position and a maximum stroke position, wherein the maximum stroke position is illustrated in the left half of the FIG. 1 and the closed position is illustrated in the right half of the FIG. 1. It can be seen in the right half of the FIG. 1 that the closing element further comprises a collar 21 extending in the axial direction and abutting against a second valve seat 22 in the closed position, which is concentric with respect to the valve rod 9 and surrounds the valve seats 7 of the check plate 8.

According to the invention, it is provided that the valve rod 9 is formed with a stop 23 which, in the present embodiment, is in the shape of a ring arranged in a groove. It is also conceivable to form this stop 23 as a radial collar on the valve rod 9, or as a corresponding collar on the guide element, if the valve rod 9 is provided with a guide element for the check plate. This stop 23 is arranged on the valve rod 9 at a distance from the limiting element 17, which distance is greater than the nominal stroke 25 of the limiting element 27 for the maximum desired flow and smaller that the maximum stroke 28. To obtain the maximum stroke 28, the plate 5 has a bore of corresponding size, i.e., it is spaced from the valve rod 9 so that the stop 23 can be passed through the plate 5.

If this combined check and control valve is used, for example, as a secondary air valve, then the valve will be, in most situations, in the position illustrated in the right part, closing the passages 6 (See FIG. 1). In the warm-up phase of the internal combustion engine, it is necessary to additionally blow air into the exhaust gas system, so that in this phase a vacuum is fed into the space 14 via the line 16. Therefore, the pressure prevailing in the space 13 is higher than the pressure in space 14, so that when a force resulting therefrom exceeds the force of a helical spring 26 arranged in the second space and biasing the valve towards the closing position, the valve rod 9 is moved in the direction of opening. Thereby, the limiting element 17 comes clear of the valve seat 22 so that air can flow from the inlet 2 to the outlet 4. This happens as soon as the pressure acting on the check plate 8 on the inlet side 2 is greater than the pressure exerted by the helical spring 20 on the check plate. Usually, this leads to the valve opening, since a substantially lower pressure prevails in the area of the outlet 4 than at the inlet 2. Accordingly, the check plate 8 also comes clear of the first valve seat 7. Should exhaust gas pulses occur that lead to overpressure in the area of the outlet 4, the check plate 8 is pressed against the valve seats 7 so that a return flow of exhaust gas into the area of the inlet 2 is avoided.

However, if, for example, at sub-zero temperatures prevailing when the engine is started up in winter, the check plate 8 should stick to one or a plurality of valve seats 7 due to ice or soot accretion in the area of the valve seats 7, then the function of the valve would be impeded. For this reason, it is necessary to provide means with which the check plate 8 is released. The stop 23 serves this purpose, with the stop pressing against the check plate 8 when the valve rod 9 is displaced beyond the nominal stroke 25, and releases the plate from the valve seat 7 through the force of the actuator 10. To serve this function and to avoid impairing the function of the check plate 8 at the same time, the axial distance between the stop 23 and the collar 21 of the limiting element 17, situated on the second valve seat 22 in the closed state, is not only smaller, in the present embodiment, than the maximum stroke 28 of the limiting element 17, but it is also larger than the nominal stroke of the limiting element 17 so that a corresponding release through the force of the actuator 10 only occurs when the nominal stroke 25 is exceeded. In this released state, the limiting element 17 is in the maximum stroke position 28 illustrated in the left half of the FIG. 1. To be able to set such different strokes, it would be necessary to provide the line 16 with an upstream valve that can set both a maximum pressure causing the release of the check plate 8 and a nominal vacuum that will subsequently restore the valve rod 9 to the nominal stroke.

It is thus possible, either, upon each start-up of the engine, to first displace the valve rod 9 beyond the nominal stroke 25 to the maximum stroke 28 and, thus, to ensure a release of the check plate 8 upon each start-up, or to provide for a current measurement so that the maximum stroke 28 is set each time necessary, provided it is first detected that a secondary air flow is absent despite the desired setting to the nominal stroke 25.

Figure 3:
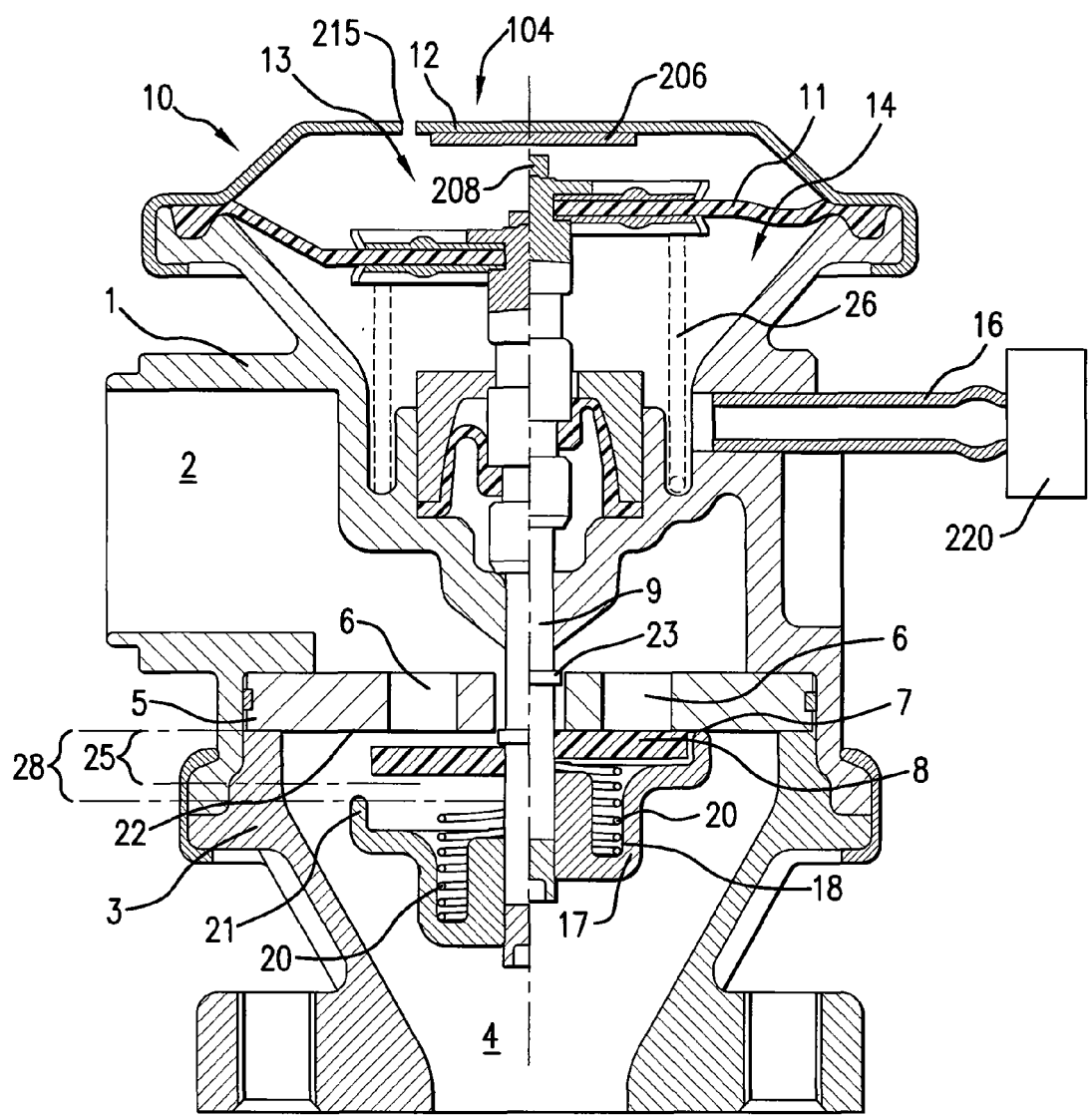
FIG. 3 shows yet another embodiment of a combined check and control valve of the present invention in side elevational view, wherein the left half of the FIG. 3 shows the valve at the maximum stroke position and the right half shows the valve in the closed position.

Furthermore, as shown by FIG. 3, a combined check and control valve may include a position controller 104 that could be formed, for example, by a magnet 208 at the end of the valve rod 9 and a contactless magneto-resistive sensor 206 corresponding with this magnet 208, wherein the sensor is arranged on the cover element 12, for example.

Figure 2:
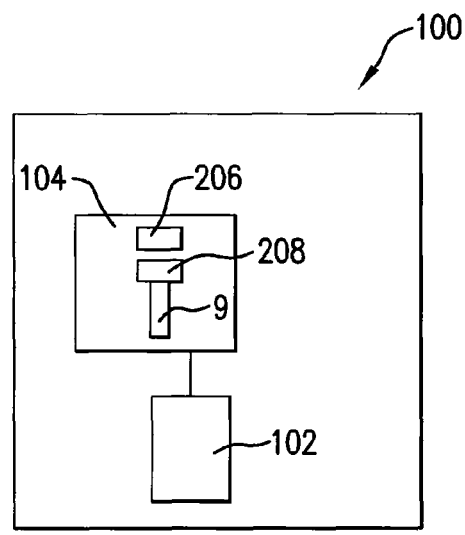
FIG. 2 is a schematic drawing of another embodiment of the combined check and control valve of the present invention.

Of course, it is also possible to provide such a combined check and control valve 100 with a solenoid 102 as shown schematically by FIG. 2, instead of a pneumatic actuator, wherein the solenoid 102 could then be supplied with two different voltages. Usually, the solenoid could be driven with a normal voltage by means of which the nominal stroke 25 of the limiting element 17 is set, and with a maximum voltage by means of which the maximum stroke 28 of the limiting element 17 is set. As shown by FIG. 2, the combined check and control valve 100 may also include a position controller 104 that is formed by the magnet 208 disposed at the end of the valve rod 9 so that it is operatively connected with a contactless magneto-resistive sensor 206.

Of course, it is also conceivable to approach intermediate positions using such a solenoid 102, or also a pneumatic actuator, given a corresponding control.

It should be mentioned that, with an optimum design of the valve, the effectively active flow section does not change substantially upon a displacement between the nominal stroke and the maximum stroke, so that a sufficient supply of secondary air is ensured.

Figure 4:
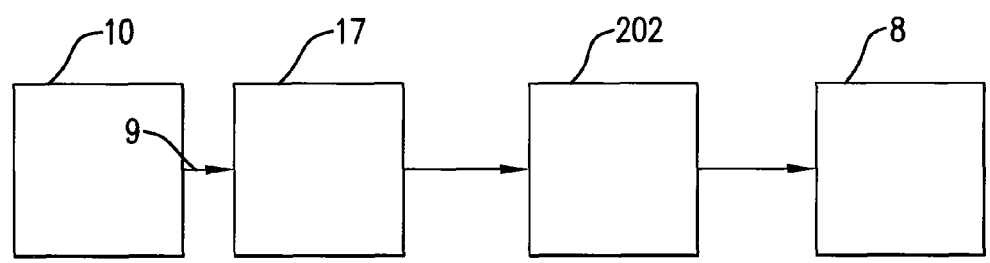
FIG. 4 is a schematic representation of an embodiment of the limiting element that includes three pockets in which are arranged three spring elements.

It should be evident that various embodiments of the structure of the secondary air valve are conceivable, where, especially, the arrangement of the spring element 20 can differ or be realized by a plurality of spring elements 202 (e.g. preferably at least three spring elements) as shown in FIG. 4. More specifically, the limiting element 17 may be provided with pockets in which at least three spring elements 202 are arranged so that the springs 202 bear on the check plate 8 as shown in FIG. 4. Thus, as shown schematically in FIG. 4, the actuator 10 is operable to displace the limiting element 17 via the valve rod 9 so that at least three spring elements 202 bear on the check plate 8. It has already been mentioned that different actuators for such valves are conceivable. Furthermore, the field of application of such a valve is not limited to the secondary air supply described above.

The invention claimed is:

1. A combined check and control valve, comprising:
   (a) a housing having an inlet and an outlet;
   (b) one or more passages arranged between the inlet and the outlet of the housing, wherein each passage is surrounded by a respective first valve seat;
   (c) a check plate operable to close each passage;
   (d) at least one spring element operable to bias the check plate against the one or more first valve seats;
   (e) an actuator;
   (f) a limiting element that is at least indirectly fixedly secured to a valve rod operable by the actuator;
   wherein the valve rod is at least indirectly connected with a stop situated at a constant distance from the limiting element;
   wherein the limiting element supports the at least one spring element, thereby allowing the at least one spring element to bias the check plate; and
   wherein the stop is positioned on the valve rod so that the stop presses against the check plate when the limiting element is opened beyond a nominal stroke by force of the actuator.

2. The combined check and control valve of claim 1, wherein a guide element is arranged on the valve rod, wherein the check plate is arranged to slide on the guide element.

3. The combined check and control valve of claim 2, wherein the stop is formed as a collar on the guide element.

4. The combined check and control valve of claim 1, wherein the combined check and control valve has a closed state, and the limiting element abuts on the check plate in the closed state of the combined check and control valve.

5. The combined check and control valve of claim 1, wherein the limiting element has an outer circumference provided with an axial collar, wherein, in a closed state of the combined check and control valve, the axial collar of the limiting element abuts on a second valve seat surrounding the first valve seat.

6. The combined check and control valve of claim 1, wherein the actuator is a solenoid.

7. The combined check and control valve of claim 6, wherein, in order to operate the valve rod, the solenoid is driven with a voltage below a maximum voltage.

8. The combined check and control valve of claim 1, wherein the actuator is a pneumatically operated actuator.

9. The combined check and control valve of claim 1, wherein the check and control valve comprises a position control.

10. The combined check and control valve of claim 9, wherein the position control includes a magnet coupled with the valve rod and the magnet is operatively connected with a contactless magneto-resistive sensor fixedly secured in the housing.

11. The combined check and control valve of claim 1, wherein the at least one spring element is a helical spring radially surrounding the valve rod.

12. The combined check and control valve of claim 1, wherein at least three spring elements are arranged in pockets in the limiting element, wherein the at least three spring elements bear on the check plate.

13. An internal combustion engine exhaust system comprising a secondary air valve, wherein the secondary air valve is the combined check and control valve of claim 1.

14. The combined check and control valve of claim 1, wherein the constant distance from the limiting element is a distance that is greater than the nominal stroke and smaller than the maximum stroke.

15. The combined check and control valve of claim 1, wherein a first space is defined between the housing and a cover element clamped to the housing, and the actuator comprises a membrane, wherein a first end of the valve rod is fixedly connected to the membrane and an outer circumference of the membrane is clamped between the housing and the cover element in a manner that divides the first space into a second space and a third space, wherein the cover element includes a hole formed therein so that atmospheric pressure prevails in the second space, and a vacuum source is connected to the third space so as to feed a pilot pressure into the third space.

16. A combined check and control valve, comprising:
   (a) a housing having an inlet and an outlet;
   (b) one or more passages arranged between the inlet and the outlet of the housing, wherein each passage is surrounded by a respective first valve seat;
   (c) a check plate operable to close each passage;
   (d) at least one spring element operable to bias the check plate against the one or more first valve seats;
   (e) an actuator;
   (f) a limiting element that is at least indirectly fixedly secured to a valve rod operable by the actuator;
   wherein the valve rod is connected with a stop situated at a constant distance from the limiting element;
   wherein the limiting element supports the at least one spring element, thereby allowing the at least one spring element to bias the check plate; and
   wherein the stop is positioned on the valve rod so that the stop presses against the check plate when the limiting element is opened beyond a nominal stroke by force of the actuator.

17. The combined check and control valve of claim 16, wherein the stop comprises a ring arranged in a groove formed in the valve rod.

18. The combined check and control valve of claim 16, wherein the constant distance from the limiting element is a distance that is greater than the nominal stroke and smaller than the maximum stroke.

19. The combined check and control valve of claim 16, wherein a first space is defined between the housing and a cover element clamped to the housing, and the actuator comprises a membrane, wherein a first end of the valve rod is fixedly connected to the membrane and an outer circumference of the membrane is clamped between the housing and the cover element in a manner that divides the first space into a second space and a third space, wherein the cover element includes a hole formed therein so that atmospheric pressure prevails in the second space, and a vacuum source is connected to the third space so as to feed a pilot pressure into the third space.

* * * * *